United States Patent [19]

Cymara

[11] 4,260,325
[45] Apr. 7, 1981

[54] PANEMONE WIND TURBINE

[76] Inventor: Hermann K. Cymara, R.D. #2, 176 Horton Rd., Newfield, N.Y. 14867

[21] Appl. No.: 92,226

[22] Filed: Nov. 7, 1979

[51] Int. Cl.³ ............................................. F03D 3/04
[52] U.S. Cl. .............................. 415/2 R; 416/197 A
[58] Field of Search ..................................... 415/2-4; 416/197 A

[56] References Cited

U.S. PATENT DOCUMENTS

| | | | |
|---|---|---|---|
| 232,558 | 9/1880 | Smith | 415/4 |
| 658,129 | 9/1900 | Steude | 415/2 R |
| 1,413,861 | 4/1922 | McDowell | 416/197A X |
| 1,485,649 | 3/1924 | Van Leggelo | 416/197 A X |
| 1,615,675 | 1/1927 | Bender | 415/2 R |
| 3,895,882 | 7/1975 | Moyer | 415/2 R |

FOREIGN PATENT DOCUMENTS

| | | | |
|---|---|---|---|
| 535624 | 10/1931 | Fed. Rep. of Germany | 416/197 A |
| 2460075 | 7/1976 | Fed. Rep. of Germany | 415/2 R |
| 575587 | 7/1924 | France | 415/2 R |
| 61140 | 3/1955 | France | 416/197 A |
| 2286954 | 4/1976 | France | 415/2 |

*Primary Examiner*—Everette A. Powell, Jr.
*Attorney, Agent, or Firm*—Charles S. McGuire

[57] ABSTRACT

The disclosed wind turbine is designed to optimize power output at a given wind velocity without corresponding increases in cost. The rotor carries a plurality of vertical vanes arranged at an acute angle to diametric lines through the rotor and the inner edges of the vanes, which are spaced from the rotor center. Each vane carries a plurality of fins extending on opposite sides of the vanes. In one embodiment, a wind-collecting shroud is movable to position an open side thereof in the upwind direction and is shaped to direct the wind more efficiently toward the vanes and fins. In a second embodiment, each vane is bent on a vertical axis to include two portions, at least the inner of which carries wind-collecting fins, at different angles to the rotor diameter, and no shroud is used.

5 Claims, 4 Drawing Figures

PANEMONE WIND TURBINE

BACKGROUND OF THE INVENTION

The present invention relates to wind turbines, and more specifically to novel vertical-axis rotor wind collectors.

Winds are among the oldest forms of energy converted to useful purposes of man. Due to enormously increased demands for energy in recent times, fossil and nuclear fuels have been preferred due to the intermittent and relatively dilute nature of wind energy. However, new emphasis has recently been placed upon development of means for utilizing solar and wind energy, which is clean, replenishable, and non-hazardous as compared to the more widely used energy resources.

The earliest wind turbines were probably simple vertical-axis panemones, such devices having been used at least 2,000 years ago. Vertical-axis rotors have an advantage over horizontal-axis rotors since they do not have to be turned as the direction of the windstream varies. This reduces design complexity and decreases stress on the blades, bearings and other components as compared to horizontal-axis systems. Most vertical-axis panemones use drag forces to turn rotors of various shapes, although others utilize rotors providing some lift forces, such as the Savonius S-shaped rotors, and still others are primarily lift devices, such as Darrieus-type rotors.

It is a principal object of the present invention to provide novel and improved vertical-axis wind turbines having a unique arrangement of rotor vanes and fins.

Another object is to provide a novel vertical-axis panemone having a wind-collecting shroud movable with wind direction to enhance operating efficiency at a given wind velocity.

Other objects will in part be obvious and will in part appear hereinafter.

SUMMARY OF THE INVENTION

The vertical-axis rotor of the present invention includes a plurality of vertically disposed vanes secured at opposite ends to horizontally disposed, annular members which are mounted upon and rotatable with a central, vertical shaft. The vanes are arranged so that each lies at an acute angle with respect to a line through the inner edge of the vane and the center of the rotor. Each vane carries a plurality of fins at spaced intervals along the length thereof. The fins extend outwardly from opposite sides of the vane to form a "V" configuration, with the open end of the V directed away from the rotor axis.

In a first embodiment, the rotor is partly surrounded by a shroud which has an open side to admit wind to impinge on the rotor blades. The open side extends for more than 90°, but preferably less than 135°, and is defined by outwardly extending portions on each side which direct the wind in the most efficient direction upon the vanes and fins. The shroud is rotatable about the rotor axis and a rudder is provided to position the open side in the upwind direction.

In a second embodiment, the shroud is omitted, but the vanes are elongated horizontally and bent along a vertical axis to define two portions at an obtuse angle to one another. The portion closest to the rotor axis carries at least a majority of the fins extending outwardly from opposite sides thereof with an acute angle between the fin and vane designed to catch the wind as each successive vane is exposed to the upwind side of the rotor. The portion of each vane lying furthest from the rotor is disposed at an angle either greater or less than 90° with respect to a line through the axis of the rotor and the edge of the vane lying closest to the axis.

DETAILED DESCRIPTION

Figure 1:
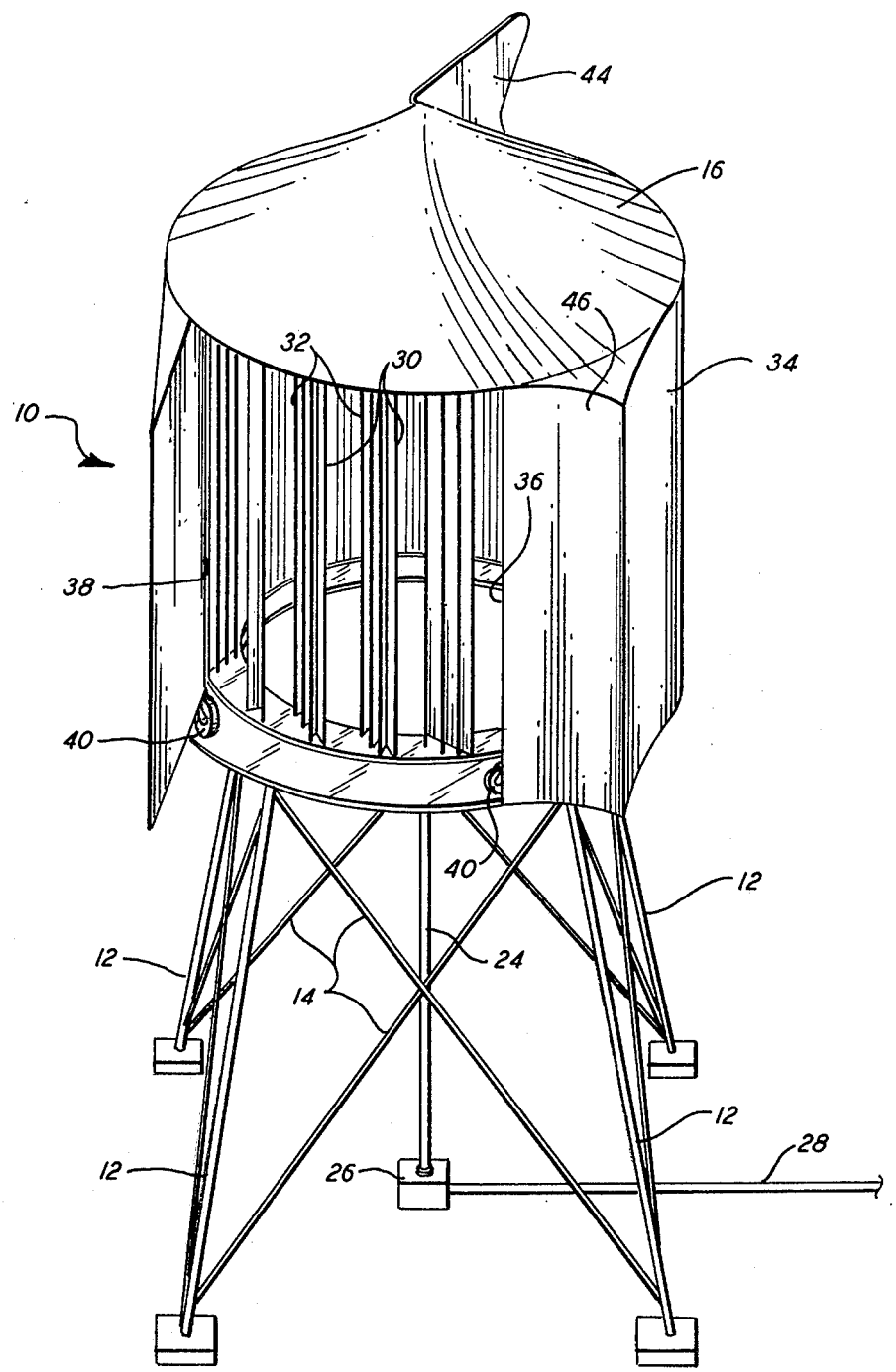
FIG. 1 is a perspective view of a first embodiment of the wind turbine of the invention.
Figure 2:
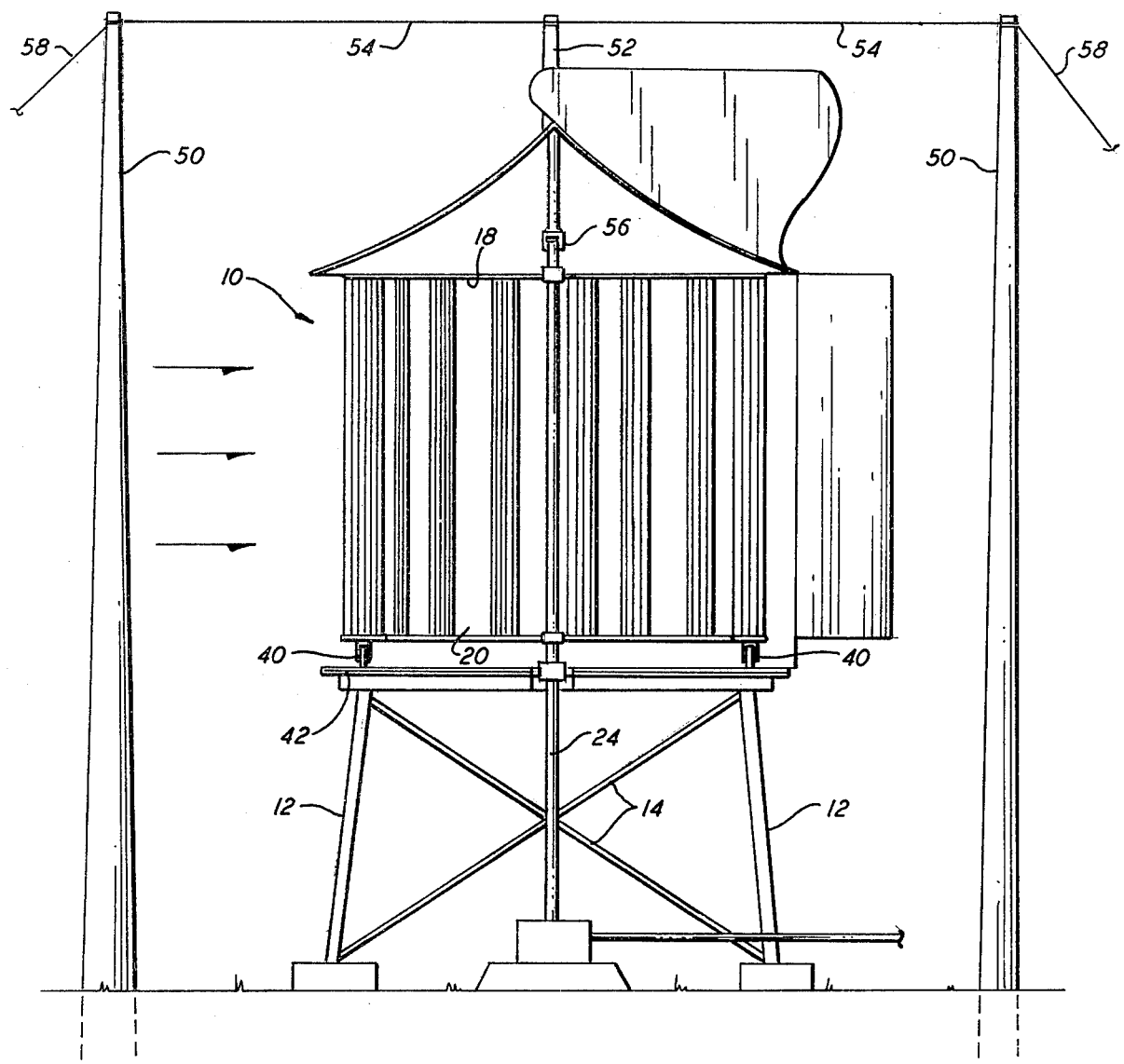
FIG. 2 is an elevational view, in half section, of the turbine of FIG. 1.
Figure 3:
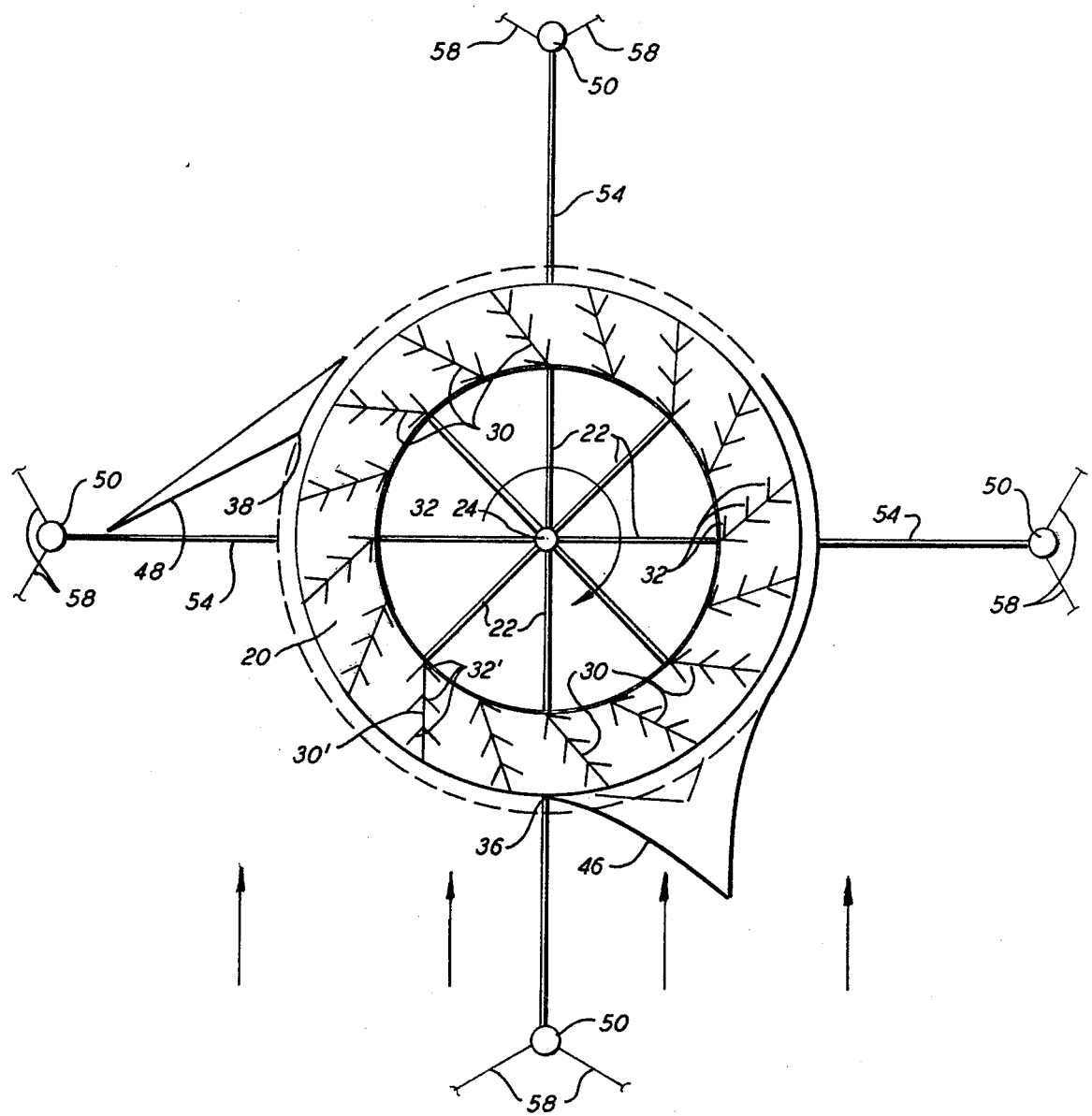
FIG. 3 is a plan view in section on the line 3—3 of FIG. 2.

Referring now to the drawings, in FIGS. 1-3 is shown an embodiment of panemone windmill denoted generally by reference numeral 10 and supported at any desired height above ground level by legs 12, reinforced by truss members 14. The structure is covered by peaked hood 16 to afford some protection from the elements of the moving parts of the system.

The rotor of panemone 10 includes a pair of annular members 18 and 20 disposed in spaced, parallel, horizontal planes. Both the upper and lower annular members are connected by spokes 22 to central shaft 24 which extends downwardly to gear box 26, through which it is coupled to output shaft 28. The rotational speed of output shaft 28 may be in any desired ratio to that of shaft 24, and either rotational speed or load may be varied as the wind velocity varies. The mechanical motion of output shaft 28 may be utilized to generate electricity, pump water, produce heat, or perform any other desired energy-related function, either directly or through energy storage means.

The upper and lower ends of vanes 30 are fixedly attached to annular members 18 and 20, respectively. As best seen in the plan view of FIG. 3, each of vanes 30 is arranged at an acute angle (about 45° as illustrated herein) with respect to a line extending through the center of the rotor and the edge of the vane closest thereto. Also, each vane carries a plurality (three, in the illustrated embodiment) of V-shaped fins 32, rigidly connected to and extending outwardly from opposite sides of each vane. Fins 32 are arranged at an acute angle with respect to the portion of the vane on the outside of the connection of the fin to the vane, i.e., the side facing away from the rotor axis.

Partially surrounding the rotor, comprised of annular members 18 and 20, spokes 22, vanes 30 and fins 32, is a wind shield or shroud 34. An open side of shroud 34, through which wind may pass to impinge upon the rotor vanes and fins, is defined by edges 36 and 38. Shroud 34 is supported for rotation upon rollers 40, which rest upon plate 42, a short distance below lower annular member 20. The upper end of shroud 34 carries hood 16 or, alternatively, is rotatably connected thereto so that the hood may remain stationary as the shroud rotates. Preferably, the hood is connected to and rotates with the shroud to provide structural stability. Tail fin or rudder 44 is connected to hood 16 in constructions where the latter is fixed with respect to shroud 34; if hood 16 remains stationary, rudder 40 is connected directly to shroud 34. The rotational position of shroud 34 is thus responsive to wind direction, the relative orientation of rudder 44 and shroud 34 being such that the open side of the shroud through which wind enters is positioned as shown in FIG. 3 with respect to wind direction indicated therein by the arrows; the opposite side likewise being open to permit the wind to pass through.

The portion of shroud 34 extending from edge 36 defines a concave surface 46 designed to direct wind impinging thereon toward vanes 30 in the direction of rotation of the rotor. Thus, a larger area of the wind force is utilized than that defined by the open side of shroud 34. This effect is further enhanced by surface 48 which extends outwardly from edge 38 to capture and direct wind (which would otherwise pass with no effect into the rotor) in the general direction of rotation thereof.

It should also be noted that an important feature of the invention is the provision of fins 32 and their arrangement with respect to vanes 30. That is, a portion of the reactive wind force is applied against the fin surfaces to assist the rotational forces produced by impingement of the wind on the vane surfaces. For example, although the vane designated by reference numeral 30' is approximately parallel to the wind direction, whereby little or no reactive force is applied to a vane in this position, fins 32' will catch a certain amount of wind which will thereby assist in rotation of the rotor. From an examination of FIG. 3, it may be seen that wind forces are effectively applied over substantially 180° of the rotor due to the arrangement of vanes 30 and fins 32, as well as the enhanced effect produced by surfaces 46 and 48 of shroud 34.

Structural stability is preferably sided by a system of poles 50 spaced about panemone 10 and connected to center pole 52 by wires 54. Slip joint 56 allows shaft 24 to rotate as pole 52, mounted upon the shaft, remains stationary. Guy wires 58 are provided as necessary to stabilize poles 50.

Figure 4:
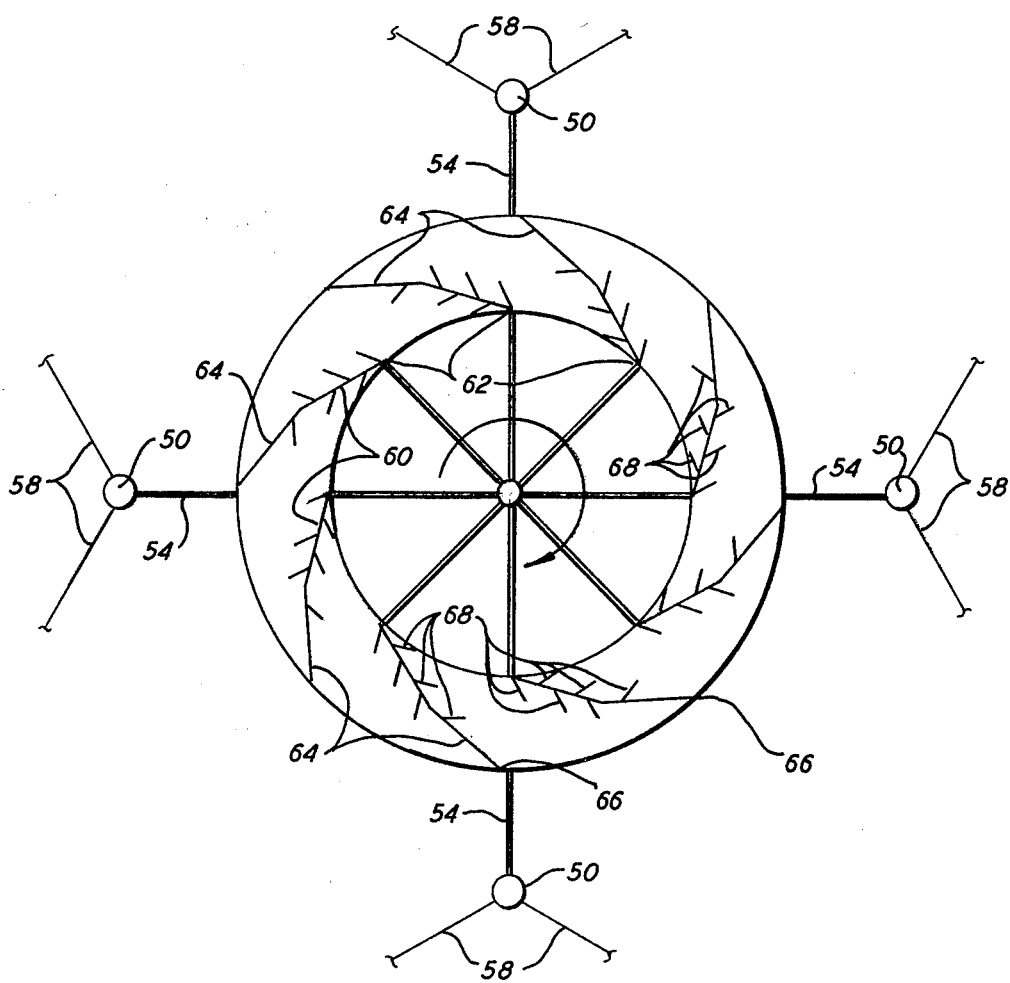
FIG. 4 is a sectional plan view of a second embodiment.

Turning now to the embodiment of FIG. 4, a panemone is shown in plan view having a rotor similar to that of the previous embodiment with a somewhat different vane and fin configuration. The same stabilizing arrangement of poles and guy wires is used, being denoted by same reference numerals, as are other elements common to both embodiments. Each of the vanes carried between support members 18 and 20 includes a first portion 60 extending from inner edge 62 for a portion of the length of the vane and disposed at an acute angle (in the illustrated construction, somewhat greater than 45°) to a straight line through the central axis of the rotor and the inner edge of the vane. A second portion 64 of each vane extends from the first portion to the outer edge 66. The vanes are integrally formed with a vertical bend representing the junction of first and second portions 60 and 64, respectively. Second portion 64 is generally planar, but may be somewhat curved in plan view, being generally disposed along a line at a greater angle to the diametric line through the inner edge of the vane than the acute angle of first portion 60.

Fins 68 are fixedly attached to opposite sides of the vanes, all or most of the fins being attached to first, or inner vane portion 60. The fins are not directly opposite one another, as in the first embodiment, and either arrangement may be used in both of the disclosed embodiments. Again, the angular arrangement of the fins with respect to the associated vane surface is calculated to concentrate the motive force of the wind upon the vane in certain rotational positions thereof, making maximum use of the available power within the limits of a rotor having fixed (as opposed to variable pitch) vanes.

What is claimed is:
1. A panemone wind turbine comprising, in combination:
    (a) upper and lower planar, annular support members mounted in spaced, horizontal planes for rotation about a central, vertical axis;
    (b) a plurality of rectangular vanes each affixed along opposite horizontal edges to said upper and lower support members and having inner and outer free vertical edges, said inner edge being substantially spaced from said axis;
    (c) each of said vanes lying in a plane at a predetermined, obtuse angle to a line extending radially from said central axis to said inner vertical edge of each vane;
    (d) a plurality of rectangular fins of the same height and substantially smaller width than said vanes affixed along opposite horizontal edges to said upper and lower support members, and along one vertical edge to the surfaces of each of said vanes;
    (e) said fins being affixed in spaced relation to one another along both surfaces of each of said vanes, each fin attached to one vane surface lying directly adjacent a fin attached to the opposite vane surface, whereby said fins are arranged in pairs along opposite vane surfaces;
    (f) each fin being disposed at a predetermined acute angle to the vane to which it is affixed, whereby each fin forms a V with respect to the associated vane, the open end of the V facing away from said central axis to catch wind and receive motive force therefrom when the vane is parallel to the wind direction;
    (g) a shroud mounted for rotation about said central axis and partially surrounding said vanes and support members and having an open side defined by two vertical edges spaced greater than 90° and less than 180° about the periphery of said shroud;
    (h) a wind deflecting surface mounted upon said shroud outwardly of each of said vertical edge to direct wind more efficiently upon said vanes and fins; and
    (i) a rudder attached to said shroud for rotating the latter in response to wind direction to position said open side in the upwind direction.

2. The invention according to claim 1 wherein said obtuse angle is about 135°.

3. The invention according to claims 1 or 2 wherein said acute angle is about 45°.

4. The invention according to claims 1 or 2 wherein at least three of said fins extend outwardly from each side of each of said vanes.

5. The invention according to claims 1 or 2 and further including a protective hood covering said upper support member.

* * * * *